United States Patent
Xiao et al.

(10) Patent No.: US 10,298,301 B2
(45) Date of Patent: May 21, 2019

(54) CHANNEL ESTIMATION FOR MILLIMETER-WAVE COMMUNICATION/DATA LINK AND THE CORRESPONDING CODEBOOK DESIGN

(71) Applicant: BEIHANG UNIVERSITY, Beijing (CN)

(72) Inventors: Zhenyu Xiao, Beijing (CN); Xianbin Cao, Beijing (CN); Xing Xi, Beijing (CN); Xiangrong Wang, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 0 days.

(21) Appl. No.: 15/907,293

(22) Filed: Feb. 28, 2018

(65) Prior Publication Data
US 2018/0248596 A1    Aug. 30, 2018

(30) Foreign Application Priority Data

Feb. 28, 2017    (CN) .......................... 2017 1 0112739

(51) Int. Cl.
*H04B 7/06*    (2006.01)
*H04B 7/08*    (2006.01)
(Continued)

(52) U.S. Cl.
CPC ......... *H04B 7/0456* (2013.01); *H04B 7/0634* (2013.01); *H04B 7/0848* (2013.01);
(Continued)

(58) Field of Classification Search
CPC ... H04W 88/06; H04B 7/0456; H04B 7/0634; H04B 7/0848; H04L 25/02; H04L 25/0204; H04L 25/03929; H04L 25/03987
See application file for complete search history.

(56) References Cited

U.S. PATENT DOCUMENTS

| 2010/0015922 A1* | 1/2010 | Kawai | ................. H04B 7/0413 455/63.1 |
| 2013/0070831 A1* | 3/2013 | Tulino | ................ H04L 25/0202 375/227 |

OTHER PUBLICATIONS

S. Sun, T. S. Rappaport, R. W. Heath, A. Nix, and S. Rangan, "MIMO for millimeter-wave wireless communications: beamforming, spatial multiplexing, or both?" IEEE Communications Magazine, vol. 52, No. 12, pp. 110-121, Dec. 2014.
(Continued)

*Primary Examiner* — Sung S Ahn
(74) *Attorney, Agent, or Firm* — Pai Patent & Trademark Law Firm; Chao-Chang David Pai

(57) ABSTRACT

The channel estimation method for millimeter-wave communication includes virtual multipath acquisition and sparse reconstruction. In the virtual multipath acquisition stage, instead of searching the real multipath components (MPCs), the virtual representation of the real MPCs is derived, and the hierarchical search is utilized to acquire the virtual MPCs based on a normal limited-resolution codebook. In the sparse reconstruction stage, the real MPCs are reconstructed from the virtual MPCs acquired in the virtual multipath acquisition stage. An enhanced sub-array scheme is used to design a hierarchical codebook under a strict constant-modulus constraint. The designed codebook can be used for both analog and hybrid beamforming/combining devices. The training overhead of channel estimation and the complexity of the search are significantly reduced, and the size of the dictionary matrix is greatly reduced by exploiting the results of the virtual multipath acquisition.

15 Claims, 11 Drawing Sheets

(51) Int. Cl.
H04L 25/02 (2006.01)
H04L 25/03 (2006.01)
H04B 7/0456 (2017.01)

(52) U.S. Cl.
CPC .......... H04L 25/02 (2013.01); H04L 25/0204 (2013.01); H04L 25/03929 (2013.01); H04L 25/03987 (2013.01)

(56) References Cited

OTHER PUBLICATIONS

A. Alkhateeb, O. El Ayach, G. Leus, and R. W. Heath, "Channel estimation and hybrid precoding for millimeter wave cellular systems," IEEE Journal of Selected Topics in Signal Processing, vol. 8, No. 5, pp. 831-846, Oct. 2014.

Z. Xiao, T. He, P. Xia, and X.-G. Xia, "Hierarchical codebook design for beamforming training in millimeter-wave commmunication", IEEE Transactions on Wireless Communications, No. 5, pp. 3380-3392, May 2016.

A. Alkhateeb, G. Leus, and R. W. Heath. "Compressed sensing based multi-user millimeter wave systems: How many measurements are needed?" IEEE International Conference on Acoustics, Speech and Signal Processing IEEE, 2015:2909-2913.

J. Lee, G.-T. Gil, and Y. H. Lee, "Exploiting spatial sparsity for estimating channels of hybrid MIMO systems in millimeter wave communications," in IEEE Global Communications Conference, IEEE, 2014, pp. 3326-3331.

* cited by examiner

| Cos Angle | -1 | | | | | | | | | | | | | | | 1 |
|---|---|---|---|---|---|---|---|---|---|---|---|---|---|---|---|---|
| The 0-th Layer | w(0,1) | | | | | | | | | | | | | | | |
| The 1-st Layer | w(1,1) | | | | | | | | w(1,2) | | | | | | | |
| The 2-nd Layer | w(2,1) | | | | w(2,2) | | | | w(2,3) | | | | w(2,4) | | | |
| The 3-rd Layer | w(3,1) | | w(3,2) | | w(3,3) | | w(3,4) | | w(3,5) | | w(3,6) | | w(3,7) | | w(3,8) | |
| The 4-th Layer w(4,X) | 1 | 2 | 3 | 4 | 5 | 6 | 7 | 8 | 9 | 10 | 11 | 12 | 13 | 14 | 15 | 16 |

FIG. 3

CHANNEL ESTIMATION FOR MILLIMETER-WAVE COMMUNICATION/DATA LINK AND THE CORRESPONDING CODEBOOK DESIGN

FIELD OF THE INVENTION

The invention belongs to the technical field of millimeter-wave (mmWave) communication. Specifically, the invention refers to channel estimation for mmWave communication based on virtual multipath acquisition and sparse reconstruction.

DESCRIPTION OF RELATED ART

Recently, with the rapid development of wireless communication technology, wireless communication has played a critical role in our lives. However, due to the increasing bandwidth requirement of wireless communication, spectrum resources in low frequency band are becoming increasingly scarce. The mmWave communication has drawn global attention in the past few years because of its abundant frequency resources.

However, mmWave communication is also facing sonic technical challenges. According to the classic Fries formula, the mmWave band has an extremely high path loss compared to low frequency band. To bridge the link budget gap due to the path loss in the mmWave band, and meanwhile to fulfil the low hardware cost requirement, analog beamforming/combining is usually preferred, wherein all the antennas share a single radio-frequency (RF) chain and have constant-modulus (CM) constraint on their weights. Meanwhile, a hybrid analog/digital preceding/combining structure has also been proposed to realize multi-stream/multiuser transmission, wherein a small number of RF chains are tied to a large antenna array. Subject to the beamforming/combining structures, the conventional channel estimation methods developed for classic multiple-input multiple-output (MIMO) communications is rather inefficient for mmWave communication due to high pilot overhead as well as high computational cost. Instead, two approaches, i.e., hierarchical search and compressed sensing (CS), are exploited in general to acquire necessary channel state information (CSI) with affordable overhead.

To enable hierarchical search, a coarse sub-codebook may be defined with a small number of coarse sectors (or low-resolution beams) covering the intended angle range, while a fine sub-codebook may be defined with a large number of fine (or high-resolution) beams covering the same intended angle range. A coarse sector may have the same coverage as that of multiple fine beams together. A divide-and-conquer search may then be carried out across the hierarchical codebook, by finding the best sector first on the low-resolution codebook level, and then finding the best beam on the high-resolution codebook level, while the best high-resolution beam is encapsulated in the best sector. The hierarchical search method is time efficient and can achieve a high detection rate to acquire a multipath component (MPC). However, it is usually limited to acquisition of only one single MPC due to the limited angle resolution of the codebook.

Since mmWave channel is generally sparse in the angle/spatial domain, the CS approach is also an attractive candidate. Different from the hierarchical search method, the CS based approaches are open-looped, which means the pilot overhead does not increase in the multi-user case. However, the performance of the CS based schemes is highly dependent on the number of measurements. To achieve satisfactory estimation performance, the training overhead is in fact considerable. Therefore, Alkhateeb et al. proposed an adaptive CS (ACS) method, wherein a hierarchical codebook was also designed to reduce the required number of measurements. Although the ACS method can reduce the overhead to some extent compared with the pure CS method, by exploiting an iterative training approach analogous to the hierarchical search, it requires a moderate to large number of RF chains, which may make it less attractive for devices with only a few RF chains or with an analog beam forming/combining structure.

SUMMARY OF THE INVENTION

To achieve fast and accurate channel estimation for mmWave communication, this invention provides a virtual multipath acquisition and sparse reconstruction (VMA-SR) method, which can be used for both the analog and hybrid beamforming/combining structures.

The proposed VMA-SR approach can be divided into two stages: virtual multipath acquisition (VMA) and sparse reconstruction (SR).

In the first stage, instead of searching the real MPCs, this invention derives the virtual representation of the real MPCs, and exploits the hierarchical search to acquire the virtual MPCs based on a normal limited-resolution codebook.

In this stage, the original L real MPCs are represented by 4L virtual MPCs, and most importantly, the transmitter (Rx) and receiver (Tx) steeling vectors of the 4 virtual MPCs, corresponding to one single real MPC, are two adjacent basis vectors within the angle of arrival (AoA) and the angle of departure (AoD) domains, respectively.

In the second stage, the real MPCs are reconstructed from the virtual MPCs acquired in the first stage.

In this SR stage, let the estimated cos (AoA) and the estimated cos (AoD) of the l-th MPC be denoted as $\hat{\theta}_l$ and $\hat{\psi}_l$, respectively, then the uncertainty range of the l-th cos (AoA) and the l-th cos (AoD) should be $$\left[\hat{\theta}_l - \frac{2}{N_r}, \hat{\theta}_l + \frac{2}{N_r}\right] \text{ and } \left[\hat{\psi}_l - \frac{2}{N_t}, \hat{\psi}_l + \frac{2}{N_t}\right],$$

respectively, where $N_r$ and $N_t$ are the numbers of antennas at the Rx and Tx, respectively. By sampling the angle range $$\left[\hat{\theta}_l - \frac{2}{N_r}, \hat{\theta}_l + \frac{2}{N_r}\right]$$

with an interval $2/(KN_t)$ and the angle range $$\left[\hat{\psi}_l - \frac{2}{N_t}, \hat{\psi}_l + \frac{2}{N_t}\right]$$

with an interval $2/(KN_t)$, respectively, where K is the over-sampling factor, this invention can obtain the reduced Rx and Tx candidate antenna weight vectors (AWVs) $\overline{A}_r$ and $\overline{A}_t$.

Then the channel matrix H can be approximately expressed as $H = \overline{A}_r \Sigma \overline{A}_t^H$, where $\Sigma$ is a sparse matrix with every column and every row thereof having at most one nonzero element and with the nonzero elements corresponding to the channel coefficients $\lambda_l$, and the superscript H denotes conjugate transpose.

Then the virtual channel obtained through the VMA stage can be used to establish a sparse reconstruction problem to solve the real MPCs.

The sparse reconstruction problem is formulated as follows:

$$\underset{\lambda_\ell, \theta_\ell, \psi_\ell}{\text{minimize}} \| vec(H_{fd}) - (\bar{A}_t^* \otimes \bar{A}_r) vec(\Sigma) \|_2$$

$$\text{subject to} \| vec(\Sigma) \|_0 = L,$$

where $H_{fd}$ denotes the virtual channel matrix obtained through the VMA stage. By solving this problem, such parameters as channel coefficients $\lambda_l$, angles of arrival $\theta_l$ and angles of departure $\psi_l$ (l=1,2, ..., L) are obtained. Then such parameters can be used to reconstruct the original channel H.

The advantages of the invention are as follows:

(1) In the VMA stage, the virtual MPCs corresponding to a single MPC are all acquired in each search based on the proposed hierarchical search algorithm. As a result, the training overhead of channel estimation and the complexity of the search are significantly reduced.

(2) In the SR stage, the size of the dictionary matrix is greatly reduced by exploiting the results of the VMA stage, significantly reducing the computational complexity.

(3) In the VMA stage, this invention provides an enhanced sub-array scheme to design a hierarchical codebook under a strict CM constraint, which can be used for low complexity phased array. And the designed codebook can be used for both analog and hybrid beamforming/combining devices.

BRIEF DESCRIPTION OF THE DRAWINGS

FIG. 3 shows the beam coverage of a hierarchical codebook with 16 antennas;

DETAILED DESCRIPTION OF THE INVENTION

Figure 1:
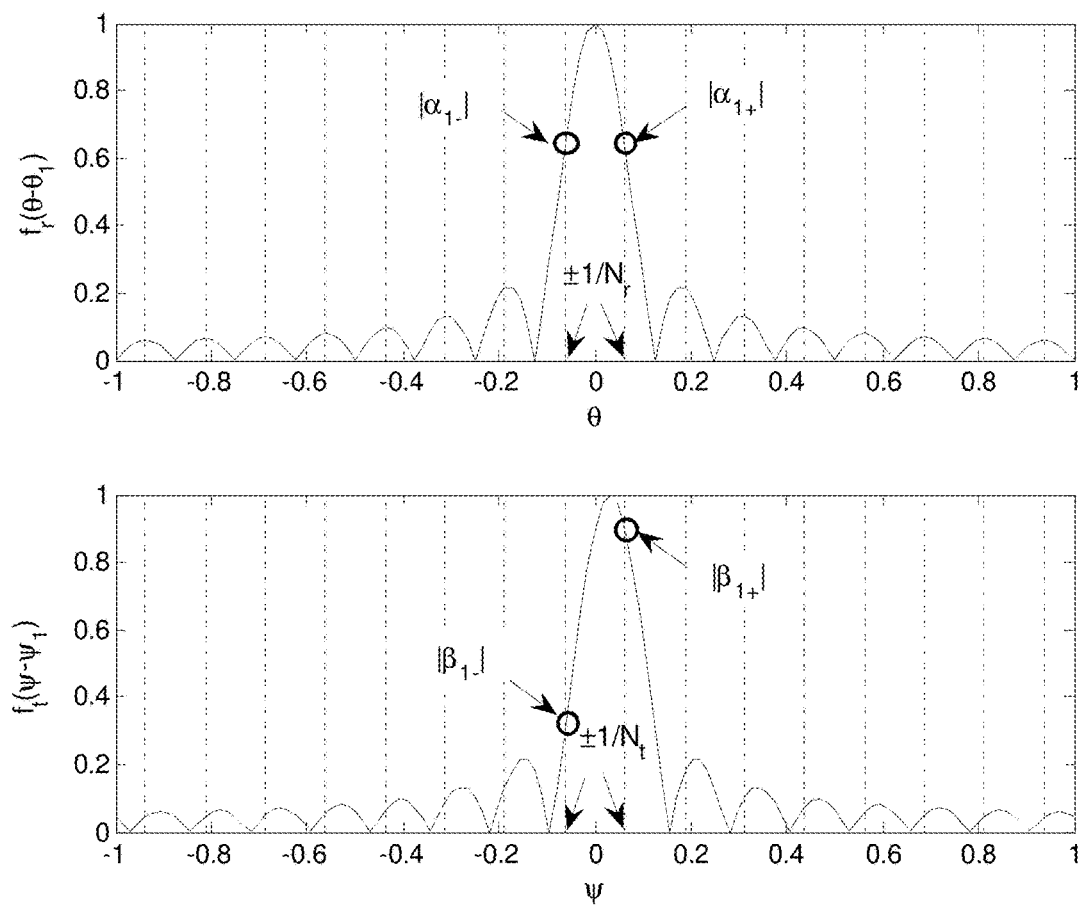
FIG. 1 illustrates the Fejér kernel functions for an MPC with AoA=0 and AoD=1/16 (in the cosine angle domain), where $N_t=N_r=8$.

The invention will now be further described referring to the attached wings and illustrative examples.

Before the virtual multipath acquisition and sparse reconstruction (VMA-SR) approach of the present application is described, the system model and existing channel estimation methods are first introduced.

A. System Models

Letting s denote a training signal with unit average power, when an analog beamforming/combining structure is adopted at the transmitter (Tx) and receiver (Rx), the received signal y is expressed as $$y = \sqrt{P} w_r^H H w_t s + z, \quad (1)$$

where P is the average transmission power, $w_r$ and $w_t$ are Rx and Tx antenna weight vectors (AWVs), respectively, H is the channel matrix, and z is the Gaussian white noise. Let $N_r$ and $N_t$ denote the numbers of antennas at the Rx and Tx, respectively. Then $w_r$ and $w_t$ are $N_r \times 1$ and $N_t \times 1$ vectors, respectively, with constant modulus (CM) and unit 2-norm, i.e., $|w_r|=1/\sqrt{N_r}$ and $|w_t|=1/\sqrt{N_t}$. In the case that a hybrid beamforming/combining structure is adopted at the Rx and Tx, $w_r$ and $w_t$ will be the product of a digital beamforming/combining vector and an analog preceding/combining matrix with constant modulus.

It is known that mmWave channels have limited scattering, and multipath components (MPCs) are mainly generated by reflections. Different MPCs have different angles of departure (AoDs) and angles of arrival (AoAs). Without loss of generality, this invention adopts the directional channel model here, which is relevant to the geometry of antenna arrays. When using uniform linear array (ULA) with a half-wavelength antenna space, an mmWave channel can be expressed as $$H = \sum_{\ell=1}^{L} \lambda_\ell a_r(\theta_\ell) a_t^H(\psi_\ell), \quad (2)$$

where $\lambda_l$ is the complex channel coefficient of the l-th path and $$\mathbb{E}\left( \sum_{\ell=1}^{L} |\lambda_\ell|^2 \right) = N_r N_t,$$

is the number of MPCs, $a_r(.)$ and $a_t(.)$ are the Rx and Tx steering vector functions, respectively, defined as $$a_r(\theta) = \frac{1}{\sqrt{N_r}} [e^{j\pi 0\theta}, e^{j\pi 1\theta}, \ldots, e^{j\pi(N_r-1)\theta}]^T, \quad (3)$$

$$a_t(\psi) = \frac{1}{\sqrt{N_t}} [e^{j\pi 0\psi}, e^{j\pi 1\psi}, \ldots, e^{j\pi(N_t-1)\psi}]^T,$$

where $\theta$ and $\psi$ are cos (AoD) and cos (AoA), respectively. Specifically, $\theta_l$ and $\psi_l$ are cos (AoD) and cos (AoA) of the l-th path, respectively. Let $\bar{\theta}_l$ and $\bar{\psi}_l$ denote the real AoD and AoA of the l-th path, respectively; then we have $\theta_l$=cos ($\bar{\theta}_l$) and $\psi_l$=cos ($\bar{\psi}_l$). Therefore, $\theta_l$ and are $\psi_l$ within the range of $[-1,1]$. For convenience, in the rest of this invention, $\theta_l$ and $\psi_l$ are called AoAs and AoDs, respectively. The superscript T denotes transpose.

B. Channel Estimation

To estimate the channel, we need to make some measurements based on the beamforming/combining structure shown in (1): In each measurement, Tx would transmit a training signal with a Tx AWV, while Rx would receive the signal with an Rx AWV. If the conventional least-square (LS) method is adopted to estimate the channel, at least $N_r N_t$ measurements are needed, which is unaffordable in mmWave communication where $N_r$ and $N_t$ are large in general. To reduce the pilot overhead, there are two main candidate approaches: the compressed sensing (CS) based method and the hierarchical search method. This invention briefly introduces them for comparison with the proposed approach.

The CS Approach: Based on the signal model in (1), multiple measurements may be made with different Tx AWVs $[w_{t1}, w_{t2}, \ldots, w_{t\varepsilon_t}] \triangleq W_t$ and Rx AWVs $[w_{r1}, w_{r2}, \ldots, w_{r\varepsilon_r}] \triangleq W_r$, where $\varepsilon_r$ is the number of the different Tx AWVs and $\varepsilon_r$ is the number of the different Rx AWVs and assuming, without loss of generality, s=1, then $$Y = \sqrt{P} W_r^H H W_t + Z, \quad (4)$$

where Z is the noise matrix. By sampling the AoA/AoD domains with sufficiently high resolution $\delta$, we can obtain $$A_r = \left[ a_r\left(-1 + \frac{\delta}{2}\right), a_r\left(-1 + \frac{3\delta}{2}\right), \ldots \right] \text{ and}$$

$$A_t = \left[ a_t\left(-1 + \frac{\delta}{2}\right), a_t\left(-1 + \frac{3\delta}{2}\right), \ldots \right].$$

Then H can be approximately expressed as $H = A_r \Sigma A_t^H$, where $\Sigma$ is a sparse matrix with every column and every row thereof having at most one nonzero element and with the nonzero elements corresponding to the channel coefficients $\lambda_l$. Substituting H in (1) with this expression and vectorizing Y, we have $$\text{vec}(Y) = \text{vec}\left(\sqrt{P} W_r^H A_r \Sigma A_t^H W_t + Z\right) \quad (5)$$

$$= \sqrt{P} \left((A_t^H W_t)^T \otimes (W_r^H A_r)\right) \text{vec}(\Sigma) + \text{vec}(Z)$$

$$\triangleq \sqrt{P} Q \text{vec}(\Sigma) + \text{vec}(Z),$$

where $\otimes$ is the Kronecker product. Since $\|\text{vec}(\Sigma)\|_0 = L \ll N_r N_t$, sparse recovery tools can be adopted to estimate H, where the dictionary matrix Q can be obtained by randomly setting the Tx and Rx training AWVs in each measurement as $[w_r]_k \in \{e^{j\theta}/\sqrt{N_r}\}$ and $[w_t]_m \in \{e^{j\theta}/\sqrt{N_t}\}$ with uniformly distributed phase $\theta$. Note that as the number of candidate vectors, i.e., the number of columns of Q, is large, the computational complexity of the CS approach is high. In addition, the total number of measurements is $T_{CS} = \varepsilon_r \varepsilon_t$. And when $T_{CS}$ is not large enough, the performance of the CS approach is not satisfactory. The adaptive compressed sensing (ACS) scheme proposed by Alkhateeb et al. can reduce the training overhead to some extent, but multiple RF chains are required to guarantee satisfactory performance.

The Hierarchical Search Approach: The hierarchical search method is based on the structure of H. As there are L MPCs to be found, it is natural to search them one by one, and a hierarchical codebook can be used to reduce the search time. Different from the single-path search, for multi-path search, the contribution of the formerly found MPCs should be subtracted from the received signal during the search of each MPC. For instance, suppose that we have estimated the coefficients, AoAs and AoDs of the first $L_f$ MPCs, denoted by $\hat{\lambda}_i, \hat{\theta}_i, \hat{\psi}_i$ for $i=1,2,\ldots,L_f$, then in the search of the $(L_f+1)$-th MPC, in each measurement we can compute the decision variable as $$\bar{y} = \underbrace{\sqrt{P} w_r^H H w_t + z}_{\text{Measured}} - \underbrace{\sqrt{P} w_r^H \left(\sum_{i=1}^{L_f} \hat{\lambda}_i a_r(\hat{\theta}_i) a_t^H(\hat{\psi}_i)\right) w_t}_{\text{FormerContribution}} \quad (6)$$

$$= \sqrt{P} w_r^H \left(\sum_{i=L_f+1}^{L} \lambda_i a_r(\theta_i) a_t^H(\psi_i)\right) w_t + z +$$

$$\sqrt{P} w_r^H \left(\sum_{i=1}^{L_f} \left(\lambda_i a_r(\theta_i) a_t^H(\psi_i) - \hat{\lambda}_i a_r(\hat{\theta}_i) a_t^H(\hat{\psi}_i)\right)\right) w_t$$

$$\triangleq \sqrt{P} w_r^H \left(\sum_{i=L_f+1}^{L} \lambda_i a_r(\theta_i) a_t^H(\psi_i)\right) w_t + z + I_{res},$$

where $I_{res}$ is the residual interference. If the AoAs and AoDs are accurately estimated, the coefficients will also be accurately estimated, and $I_{res}$ will be small. Dropping the noise component, we have $$\bar{y} \approx \sqrt{P} w_r^H \left(\sum_{i=L_f+1}^{L} \lambda_i a_r(\theta_i) a_t^H(\psi_i)\right) w_t, \quad (7)$$

which means the $(L_f+1)$-th MPC can be normally found by using the hierarchical search method. However, if the AoAs and AoDs are not accurately estimated, there would be significant coefficient errors, and $I_{res}$ will be large. In such a case, the search of the $(L_f+1)$-th MPC will be dramatically affected by the residual interference. That is to say, accurate estimation of the AoAs and AoDs are critical for the hierarchical search method. In practice, the best angle resolution of a codebook for an ULA with $N_A$ antennas is $2/N_A$ in general, because a steering vector has an angle resolution of $2/N_A$. Although it is possible to design a codebook with a much higher resolution so as to accurately estimate the AoAs and AoDs, it will accordingly increase the search time and the storage size of the codebook. More importantly, a higher angle resolution will further intensify the challenge of phase shifter design at the mmWave band, which is undesired in mmWave communication, where hardware design is already harsh. Hence, the codebook with the resolution of $2/N_A$ is a normal limited-resolution codebook, and the codebook with the resolution higher than $2/N_A$ is a high resolution codebook.

In summary, the CS approach can estimate multiple MPCs, but it requires a large number of measurements; otherwise the performance is not satisfactory. The hierarchical search method can also estimate multiple MPCs, provided that the angle resolution of the exploited codebook is sufficiently high. However, this is undesirable from the perspective of hardware design for mmWave devices.

To solve the problems in the above approaches, this invention provides a VMA-SR method to quickly and accurately acquire multiple MPCs while exploiting a normal limited-resolution codebook.

The VMA-SR method according to the present invention has two stages, namely virtual multipath acquisition (VMA) for the first stage and sparse reconstruction (SR) for the second stage.

A. The First Stage: Virtual Multipath Acquisition

I) Virtual Representation of the Real MPCs: First, we sample the AoA and AoD domains with angle resolutions $2/N_r$ and $2/N_t$, respectively, and obtain two sets of steeling vectors:

$$U = \left[a_r\left(-1+\frac{1}{N_r}\right), a_r\left(-1+\frac{3}{N_r}\right), \ldots, a_r\left(-1+\frac{2N_r-1}{N_r}\right)\right],$$

$$V = \left[a_t\left(-1+\frac{1}{N_t}\right), a_t\left(-1+\frac{3}{N_t}\right), \ldots, a_t\left(-1+\frac{2N_t-1}{N_t}\right)\right].$$

It is easy to verify that $U^H U = I_{N_r}$ and $V^H V = I_{N_t}$, which means that $$\left\{a_r\left(-1+\frac{2k-1}{N_r}\right)\right\}_{k=1,2,\ldots,N_r} \text{ and } \left\{a_t\left(-1+\frac{2k-1}{N_t}\right)\right\}_{k=1,2,\ldots,N_t}$$

constitute an orthogonal base of $\mathbb{C}^{N_r}$ and $\mathbb{C}^{N_t}$, respectively. Hence, for arbitrary $\theta_\ell$ and $\psi_\ell$ we have $$\begin{cases} a_r(\theta_\ell) = \sum_{k=1}^{N_r} \alpha_{k,\ell} a_r\left(-1+\frac{2k-1}{N_r}\right), \\ a_t(\psi_\ell) = \sum_{k=1}^{N_t} \beta_{k,\ell} a_t\left(-1+\frac{2k-1}{N_t}\right), \end{cases} \quad (8)$$

where $$\begin{cases} \alpha_{k,\ell} = a_r^H\left(-1+\frac{2k-1}{N_r}\right) a_r(\theta_\ell), \\ \beta_{k,\ell} = a_t^H\left(-1+\frac{2k-1}{N_t}\right) a_t(\psi_\ell), \end{cases} \quad (9)$$

where $\alpha_{k,\ell}$ denotes the projection of $a_r(\theta_\ell)$ in the direction of the unit vector $$a_r\left(-1+\frac{2k-1}{N_r}\right),$$

and $\beta_{k,\ell}$ denotes the projection of $a_t(\psi_\ell)$ in the direction of the unit vector $$a_t\left(-1+\frac{2k-1}{N_t}\right).$$

Let $f_r(x) = |a_r^H(\theta) a_r(\theta+x)|$, i.e., a Fejér kernel function, which goes to zero quickly by increasing $|x|$. It is known that $f_r(0)=1$, and when $|x|>1/N_r$, the kernel is far smaller than 1 given that $N_r$ is large. According to this property, there are only 2 elements in $\{\alpha_{k,\ell}\}_{k=1,2,\ldots,N_r}$ that may have a significant absolute value, which are $\alpha_{I_r^+(\theta_\ell),\ell}$ and $\alpha_{I_r^-(\theta_\ell),\ell}$ with $$\begin{cases} I_r^+(\theta_\ell) = \lceil (N_r(\theta_\ell+1)+1)/2 \rceil, \\ I_r^-(\theta_\ell) = \lfloor (N_r(\theta_\ell+1)+1)/2 \rfloor, \end{cases} \quad (10)$$

where $\lceil . \rceil$ and $\lfloor . \rfloor$ denote ceil and floor integer operations, respectively. Analogously, there are only 2 elements in $\{\beta_{k,\ell}\}_{k=1,2,\ldots,N_t}$ that may have a significant absolute value, which are $\beta_{I_t^+(\psi_\ell),\ell}$ and $\beta_{I_t^-(\psi_\ell),\ell}$ with $$\begin{cases} I_t^+(\psi_\ell) = \lceil (N_t(\psi_\ell+1)+1)/2 \rceil, \\ I_t^-(\psi_\ell) = \lfloor (N_t(\psi_\ell+1)+1)/2 \rfloor, \end{cases} \quad (11)$$

Consequently, we have $$a_r(\theta_\ell) \approx \alpha_{\ell+} a_r(\theta_{\ell+}) + \alpha_{\ell-} a_r(\theta_{\ell-}), \quad (12)$$

$$a_t(\psi_\ell) \approx \beta_{\ell+} a_t(\psi_{\ell+}) + \beta_{\ell-} a_t(\psi_{\ell-}), \quad (13)$$

where $$\begin{cases} \alpha_{\ell+} = \alpha_{I_r^+(\theta_\ell),\ell}, \quad \alpha_{\ell-} = \alpha_{I_r^-(\theta_\ell),\ell}, \\ \beta_{\ell+} = \beta_{I_t^+(\psi_\ell),\ell}, \quad \beta_{\ell-} = \beta_{I_t^-(\psi_\ell),\ell}, \end{cases} \quad (14)$$

$$\begin{cases} \theta_{\ell+} = -1 + \frac{2I_r^+(\theta_\ell)-1}{N_r}, \quad \theta_{\ell-} = -1 + \frac{2I_r^-(\theta_\ell)-1}{N_r}, \\ \psi_{\ell+} = -1 + \frac{2I_t^+(\psi_\ell)-1}{N_t}, \quad \psi_{\ell-} = -1 + \frac{2I_t^-(\psi_\ell)-1}{N_t}. \end{cases} \quad (15)$$

Finally, we can approximately express H as $$H \approx \sum_{\ell=1}^{L} \lambda_\ell [\alpha_{\ell+} a_r(\theta_{\ell+}) + \alpha_{\ell-} a_r(\theta_{\ell-})] \times [\beta_{\ell+} a_t(\psi_{\ell+}) + \beta_{\ell-} a_t(\psi_{\ell-})]^H = \quad (16)$$

$$\sum_{\ell=1}^{L} \lambda_\ell [\alpha_{\ell+} \beta_{\ell+}^* a_r(\theta_{\ell+}) a_t^H(\psi_{\ell+}) + \alpha_{\ell-} \beta_{\ell+}^* a_r(\theta_{\ell-}) a_t^H(\psi_{\ell+}) +$$

$$\alpha_{\ell+} \beta_{\ell-}^* a_r(\theta_{\ell+}) a_t^H(\psi_{\ell-}) + \alpha_{\ell-} \beta_{\ell-}^* a_r(\theta_{\ell-}) a_t^H(\psi_{\ell-})],$$

where we can find that the original L real MPCs are represented by 4L virtual MPCs, and most importantly, the Rx and Tx steering vectors of the 4 virtual MPCs, corresponding to one single real MPC, are two adjacent basis vectors within U and V, respectively. The superscript * denotes conjugate.

Figure 2:
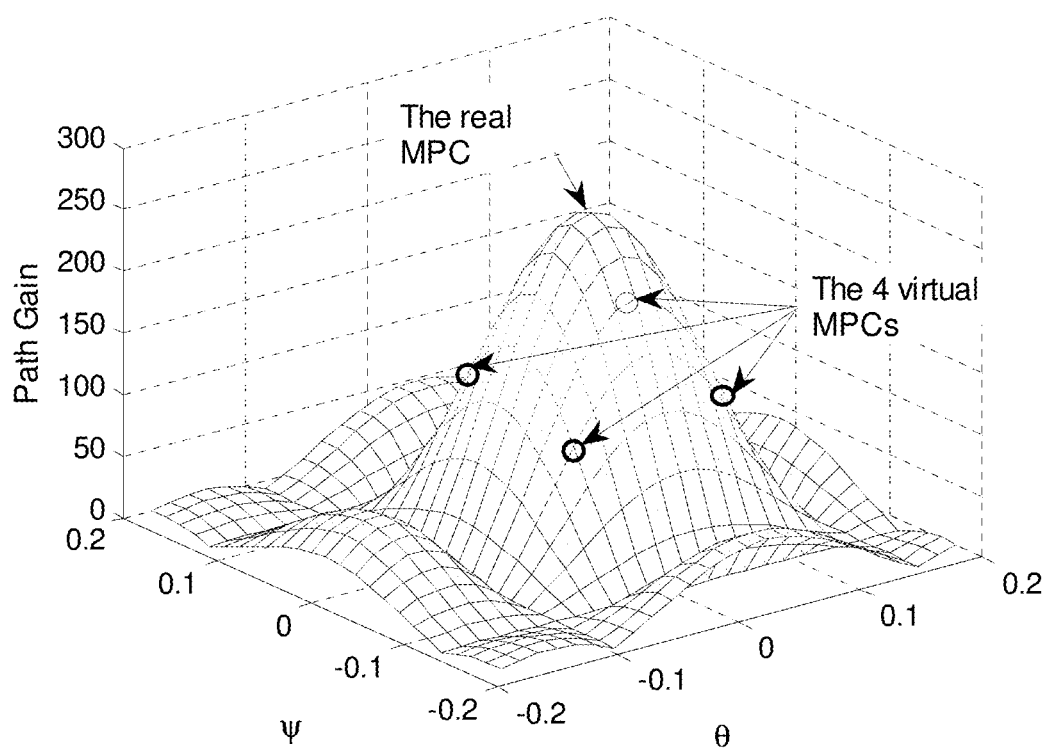
FIG. 2 illustrates the 4 virtual MPCs for a real MPC with AoA=0 and AoD =1/16 (in the cosine angle domain), where $N_t=N_r=8$.

FIG. 1 illustrates these properties of an MPC with an AoA of 0 (in the cosine angle domain) and an AoD of 1/16, where $N_t=N_r=16$, $I_r^+(\theta_\ell)=1/N_r$, $I_r^-(\theta_\ell)=-1/N_r$, $I_t^+(\psi_\ell)=1/N_t$ and $I_t^-(\psi_\ell)=-1/N_t$. The absolute values of $\alpha_{1-}$, $\alpha_{1+}$, $\beta_{1-}$ and $\beta_{1+}$ are also shown in FIG. 1. FIG. 2 shows the 4 virtual MPCs corresponding to the real MPC with an AoA of 0 and an AoD of 1/16, where $N_t=N_r=8$.

Note that different from the real MPCs which have arbitrary AoAs and AoDs, the AoAs and AoDs of the virtual MPCs can be accurately estimated with a normal limited-resolution codebook containing the AWVs in U and V, which means that, instead of directly estimating the L real MPCs, we may estimate the 4L virtual MPCs based on a limited-resolution codebook. Afterwards, we can reconstruct the original L real MPCs based on the 4L virtual MPCs.

II) Hierarchical Search of the Virtual MPCs: Since the AoAs and AoDs (in the cosine angle domain) of the virtual MPCs are within $$\left\{-1+\frac{2k-1}{N_r}\right\}_{k=1,2,\ldots,N_r} \text{ and } \left\{-1+\frac{2k-1}{N_t}\right\}_{k=1,2,\ldots,N_t},$$

respectively, the virtual MPCs can be accurately estimated by hierarchical search with a limited-resolution codebook. For instance, FIG. 3 shows a typical limited-resolution codebook $\mathcal{F}$ with N=16 antennas. The codebook has ($\log_2$ N+1) layers. In the k-th layer, k=0,1,2, . . . , $\log_2$ N, there are $2^k$ codewords of the same beam width with different steering angles and collectively covering the entire search space in the cosine angle domain. Note that a codeword is actually an AWV used for beamforming. Let w(k,n) denote the n-th codeword in the k-th layer, n=1, . . . , $2^k$. Then the beam coverage of w(k,n) is approximately the union of the beam coverage of the 2 codewords in the (k+1)-th layer, i.e., $\{w(k+1,2(n-1)+m)\}_{m=1,2}$. There are different methods to design such a codebook, and all the hierarchical codebooks designed by different methods can be used to search the virtual MPCs, provided that the last-layer codewords are steering vectors towards $$\left\{-1+\frac{2k-1}{N}\right\}_{k=1,2,\ldots,N}.$$

Based on the hierarchical codebook, we next introduce the proposed hierarchical search algorithm to acquire the virtual MPCs, which is shown in Algorithm 1, where $w_t(.)$ and $w_r(.)$ represent the Tx and Rx codewords, respectively.

---
Algorithm 1: Hierarchical Search of the Virtual MPCs.
---

1) Initialization:
S = $\log_2$ $N_r$. /*Assume $N_r$ = $N_t$ , and calculate the total number of layers S */
$S_0$ = 2. /*The initial layer index.*/
$H_{fd}$ = 0. /*The already found MPCs.*/
2) Iteration:
for l = 1:L do /*There are L iterations in the search process.*/
  /*Step 1: Search for the initial Tx/Rx codewords.*/
  for m = 1:$2^{S_0}$ do
    for n = 1:$2^{S_0}$ do
      y(m,n) = $\sqrt{P}w_r(S_0,n)^H Hw_t(S_0,m)$ + z −
      $w_r(S_0,n)^H H_{fd} w_t(S_0,m)$
  ($m_t,n_r$) = $\arg_{(m,n)}$ max | y(m,n)|
  /*Step 2: Hierarchical search. The best Tx/Rx codeword pair $w_t(S_0,m_t)$ and $w_r(S_0, n_r)$ acquired in Step 1 are treated as the parent codewords for Step 2. */
  for s = ($S_0$ + 1): S do
    for m = 1,2 do
      for n = 1,2 do
        y(m,n) = $\sqrt{P}w_r(s,2(n_r-1)+n)^H Hw_t(s,2(m_t-1)+m)$ +
        z − $w_r(s,2(n_r-1)+n)^H H_{fd} w_t(s,2(m_t-1)+m)$
    (a,b) = $\arg_{(m,n)}$ max | y(m,n)|
    $m_t$ = 2($m_t$ − 1) + a; $n_r$ = 2($n_r$ − 1) + b
  /*Step 3: Collection of the virtual MPCs: Acquire the significant virtual MPC at the last layer (S -th layer).*/
  for m = −1,0,1 do
    for n = −1,0,1 do
      y = $\sqrt{P}w_r(S,n_r+n)^H Hw_t(S,m_t+m)$ + z
      $H_{fd}$ = $H_{fd}$ + $yw_r(S,n_r+n)w_t(S,m_t+m)^H$
3) Results:
Return the virtual channel $H_{fd}$

---

There are L iterations in the search process, and the virtual MPCs corresponding to a single MPC are acquired in each iteration. The hierarchical search algorithm for the VMA-SR method is briefly illustrated as follows.

(1) Initialization: Calculate the total number of layers S, set the initial layer index $S_0$ and initialize the already found MPCs as a zero vector, i.e., $H_{fd}$=0. (2) Search process: Execute the following three steps L times.

Step 1: Search for the initial Tx/Rx codewords. As in mmWave communication the transmission power is generally limited, the beamforming training may not start from the 0-th layer, where the codeword is omni-directional and the gain is low. Instead, the beamforming training may need to start from a higher layer, e.g., the $S_0$-th layer, to provide sufficient start-up beamforming gain. In this process, there are $2^{S_0}$ candidate codewords at both Tx and Rx. Thus, an exhaustive search over all base station (BS) and mobile station (MS) codeword pairs is adopted to search the best Tx/Rx codeword pair, which are treated as the parent codewords for the following search. $m_t$ and $n_r$ denote the best Tx/Rx codeword indexes in the $S_0$-th layer, respectively. Note that when computing y(m,n), the sum of the first two terms is substituted by the measured value of the corresponding received value.

Step 2: Hierarchical search. In this process, a layered search is performed to refine the beam angle step by step, until the most significant virtual UPC is acquired at the last layer (the S-th layer).

The best Tx/Rx codeword pair $w_t(S_0,m_t)$ and $w_r(S_0,n_r)$ acquired in step 1 are treated as the parent codewords for step 2. Then a layered search is performed from the ($S_0$+ 1)-th layer to the S-th layer to acquire the most significant virtual MPC.

In the search for each layer, the best Tx/Rx codeword pair in current layer are found according to the following problem:

$$y(m, n) = \quad (17)$$
$$\sqrt{P}\, w_r(s, 2(n_r-1)+n)^H Hw_t(s, 2(m_t-1)+m) +$$
$$z - w_r(s, 2(n_r-1)+n)^H H_{fd} w_t(s, 2(m_t-1)+m),$$
$$(a, b) = \arg\max_{(m,n)} |y(m, n)|,$$

where m and n are in range of {1,2], and s is the index of the current layer. And the best codewords in the current layer are treated as the parent codewords in the next layer, i.e., after (a,b) is acquired, update the best Tx/Rx codeword indexes in the current layer. Note that when computing y(m,n), the sum of the first two terms, $\sqrt{P}w_r(s,2)(n_r-1)+n)^H Hw_t(s,2(m_t-1)+m)+z$, is substituted by the measured value of the corresponding received signal.

Step 3: Collection of the virtual MPCs. After the hierarchical search, the most significant virtual MPC is acquired. Since the other 3 virtual MPCs are adjacent to the already found MPC, we measure a ±1 AoA/AoD neighborhood to make sure that the desired virtual MPCs are all collected. Note that $y=\sqrt{P}w_r(S,n_r+n)^H Hw_t(S,m_t+m)+z$ is substituted by the measured value of the corresponding received signal. With this operation, 9 instead of 4 virtual MPCs are actually acquired. Flowever, the other 5 virtual MPCs have much smaller strength compared with the 4 desired virtual MPCs, and thus affect little on the results.

As shown in the above steps, in each measurement, Tx would transmit a training signal with a Tx AWV, while Rx would receive the signal with an Rx AWV. Then the received signal y would be measured at the Rx. In step 3, after the most significant virtual MPC is acquired, we measure a neighborhood to collect the desired virtual MPCs. Each time a virtual MPC is acquired, the virtual channel $H_{fd}$ is updated. Computing the sum of the collected virtual MPC, the virtual channel is obtained as $H_{fd}=H_{fd}+yw_r(S,n_r+n)w_t(S,m_r30\,m)^H$, where m and n are in range of $\{-1,0,1\}$.

Note that in each iteration, $H_{fd}$ obtained in the current iteration will be the initial $H_{fd}$ in the next iteration.

In Alrothm 1, it is assumed that $N_t=N_r$. When $N_t$ is different from $N_r$, Algorithm 1 may be easily modified as follows. Let $S_t$ denote the total number of layers of the Tx codebook and $S_r$ denote the total number of layers of the Rx codebook. If $S_t<S_r$, in Step 2 of Algorithm 1, when the best Tx codeword $w_t(S_t,m_t)$ at the $S_t$-th layer is acquired, the layered search of the Rx codebook continues to be performed from the $(S_t+1)$-th layer to the $S_r$-th layer to acquire the best Rx codeword $w_r(S_r,m_r)$. If $S_t>S_r$, in Step 2 of Algorithm 1, when the best Rx codeword $w_r(S_r,m_r)$ at the $S_r$-th layer is acquired, the layered search of the Tx codebook continues to be performed from the $S_r+1$-th layer to the $S_t$-th layer to acquire the best Tx codeword $w_t(S_t,m_t)$.

III) Signal measurement hardware system: In the hierarchical search of MPCs, when searching the best Tx/Rx codeword pair $w_t$ and $w_r$ in each layer, for each candidate codeword pair, the received signal y correspondimg to the codeword pair needs to be measured. To facilitate understanding of the process of measuring the received signal y, a signal measurement hardware system is described below.

Figure 4:
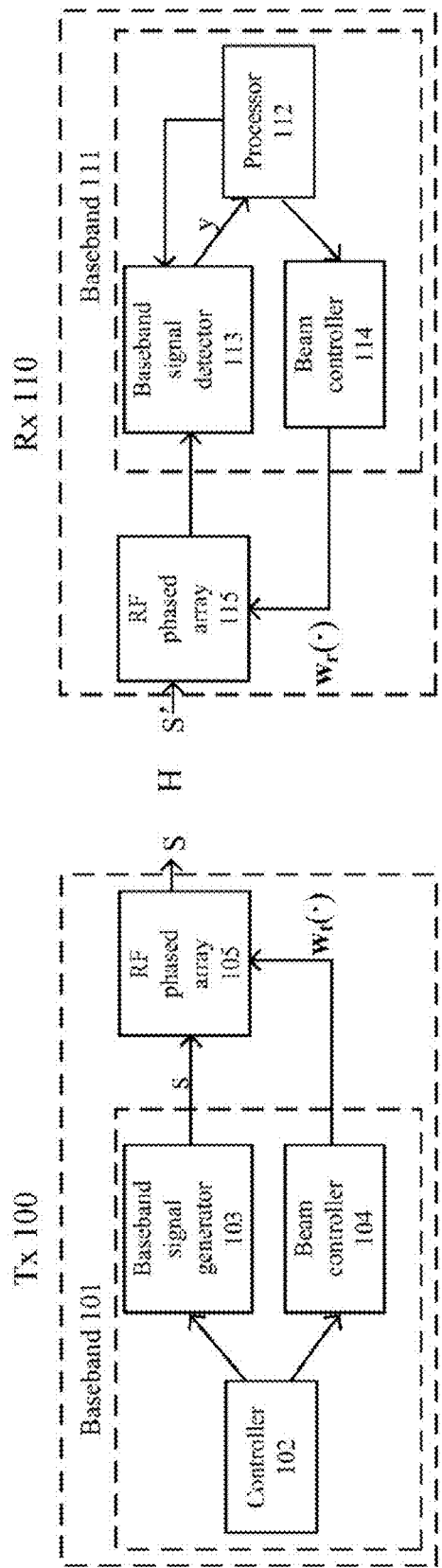
FIG. 4 illustrates a simplified block diagram of the signal measurement system for the VMA stage of the VMA-SR method according to the present application.

FIG. 4 illustrates a simplified block diagram of the signal measurement system. This system includes a transmitter 100 and a receiver 110.

Figure 5:
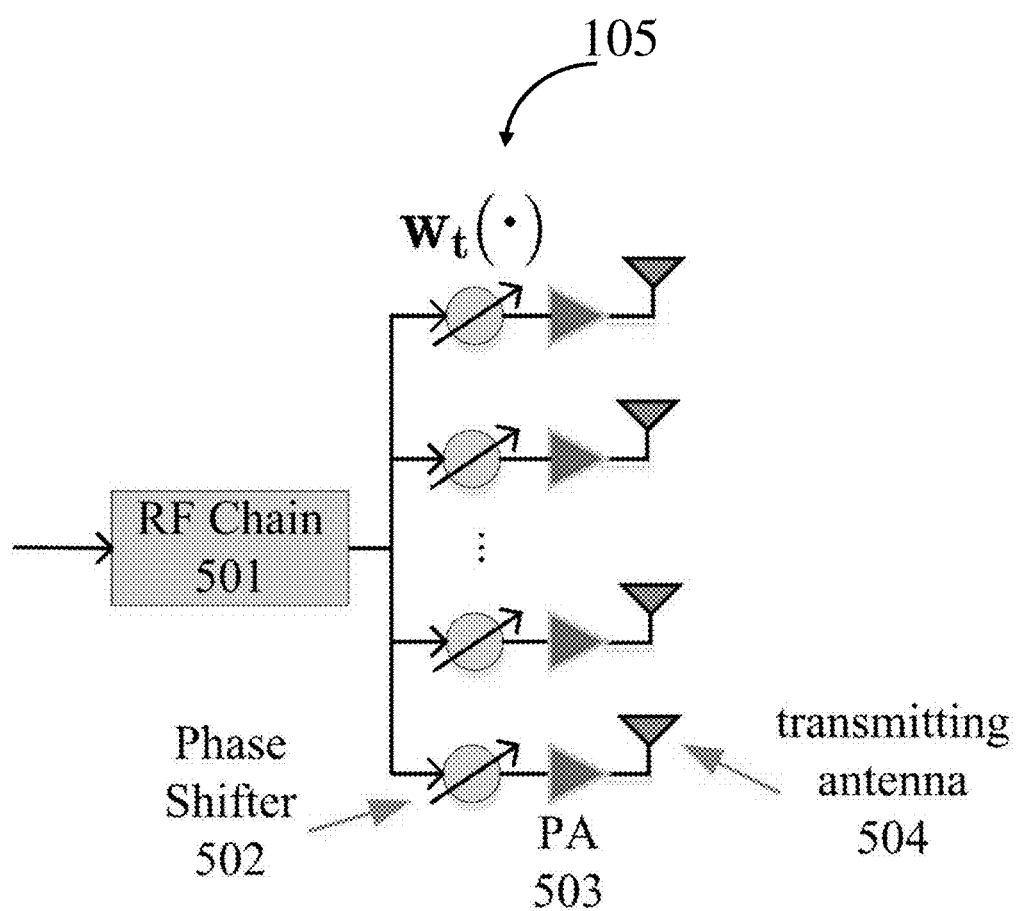
FIG. 5 illustrates the RF phased array of the transmitter of the signal measurement system.

The transmitter 100 includes a digital baseband 101 and an RF phased array 105. The digital baseband 101 includes a controller 102, a baseband signal generator 103, and a beam controller 104, wherein the controller 102 controls the baseband signal generator 103 to generate a baseband signal s and controls the beam controller 104 to generate the Tx codeword $w_t$, which is used as the Tx AWV. As shown in FIG. 5, the RF phased array 105 includes an RF chain 501, phase shifters 502, power amplifiers 503, and transmitting antennas 504, wherein the RF chain 501 generates an RF based on the baseband signal s, the phase shifters 502 adjust the phase of the RE based on the Tx AWV, the power amplifiers 503 increase the output power of the RF, and the signal S is transmitted at the transmitting antennas 504.

Figure 6:
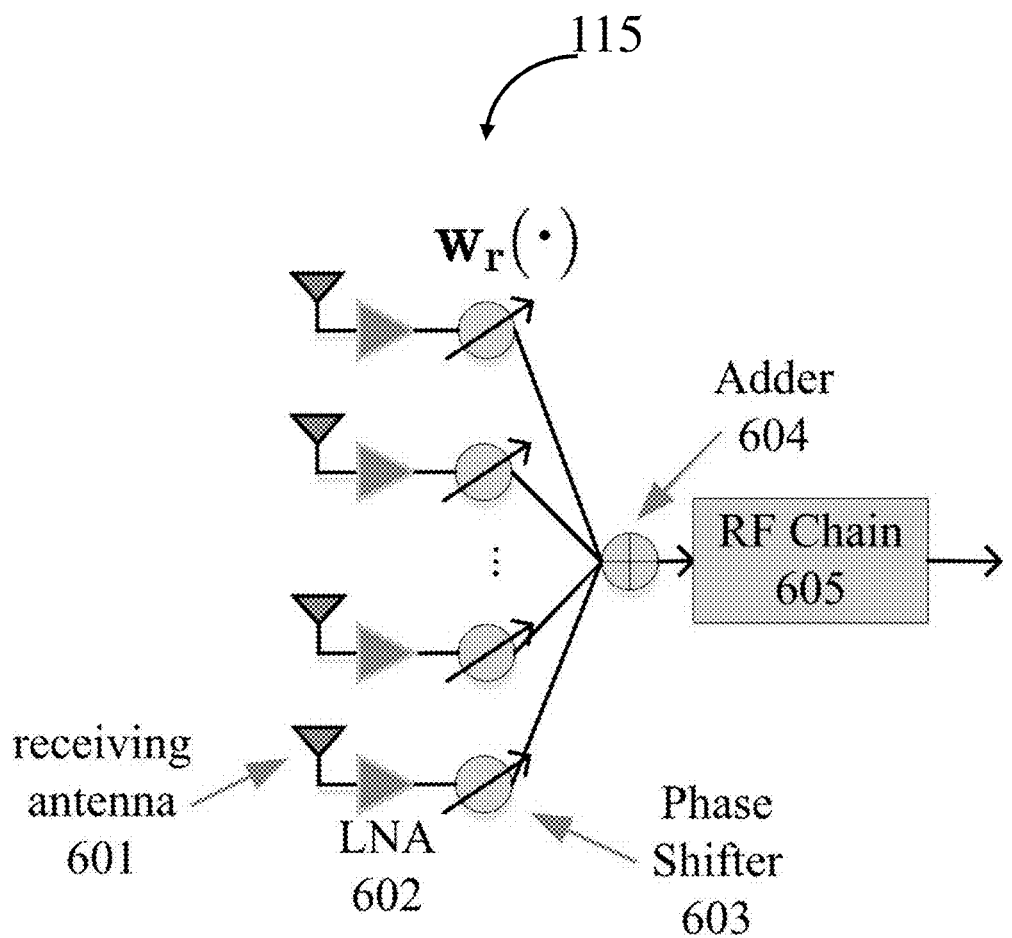
FIG. 6 illustrates the RF phased array of the receiver of the signal measurement system.

The receiver 110 includes a digital baseband 111 and an RF phased array 115. The digital baseband 111 includes a processor 112, a baseband signal detector 113 and a beam controller 114, wherein the processor 112 controls the beam controller 114 to generate the Rx codeword $w_r$, which is used as the Rx AWV, and controls the baseband signal detector 113 to detect the received signal y, and processes the received signal y. As shown in FIG. 6, the RF phased array 115 includes receiving antennas 601, low noise amplifiers 602, phase shifters 603, an adder 604 and an RF chain 605, wherein the receiving antennas 601 receive the signal S', the low noise amplifiers 602 enhance the input power of the signal, the phase shifters 603 adjust the phase of the signal based on the Rx AWV, the signals from the phase shifters 603 are added by the adder 604 and fed to the RF chain 605 to generate the RE, and the RF is fed to the baseband signal detector 113.

IV) Implementation of Hierarchical Search in Algorithm 1

Figure 7:
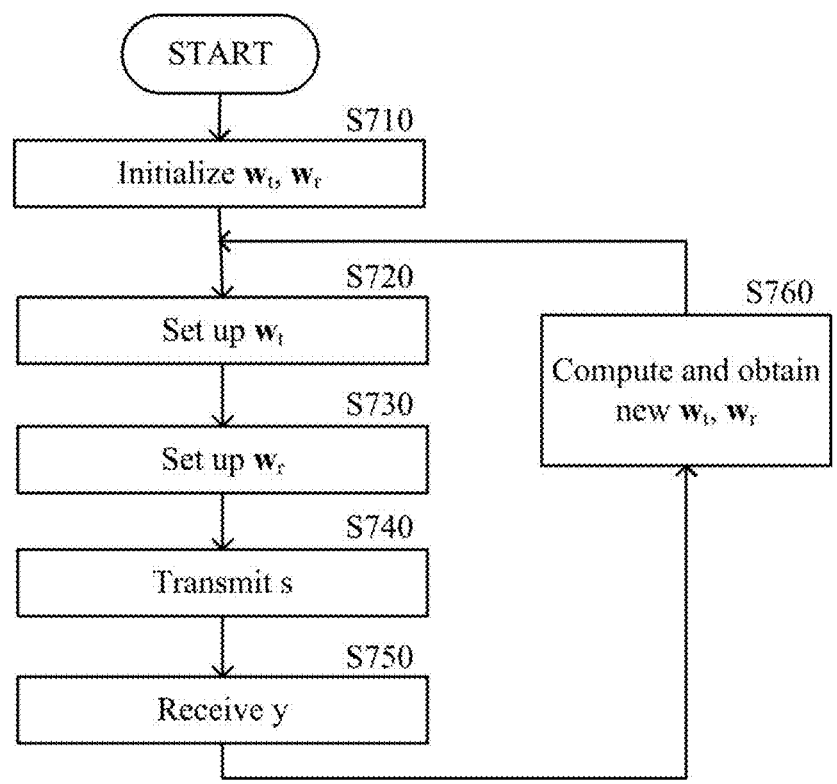
FIG. 7 shows the flowchart of a measurement process.

Hierarchical search algorithm is achieved through multiple measurements. In the search of each layer, for each candidate codeword pair of the current layer, the received signal y corresponding to the codeword pair needs to be measured, i.e., one candidate codeword pair $(w_t,w_r)$ corresponds to one measurement. In each measurement, the transmitter 100 uses $w_t$ as the Tx AWV set on the Tx RF phased array 105, and sends a baseband signal s with power P. The receiver 110 uses $w_r$ as the Rx AWV set on the Rx RF phased array 115, measures the received signal y, sends it to the processor 112 for calculation, and feeds back the result to the transmitter 100. As shown in FIG. 7, specific steps are as follows:

At S710, determine the Tx codeword $w_t$ from the Tx codebook and Rx codeword $w_r$ from the Rx codebook;

At S720, the Tx controller 102 controls the beam controller 104 to generate the Tx codeword (i.e., $w_t$), and set the weights of the RF phased array 105 (i.e., Tx AWV) with the generated codeword;

At S730, the Rx processor 112 controls the beam controller 114 to generate the Rx codeword (i.e., $w_r$), and set the weights of the RF phased array 115 (i.e., Rx AWV) with the generated codeword;

At S740, the Tx controller 102 controls the baseband signal generator 103 to generate the baseband signal s, and the RF phased array 105 generates the transmitted signal S;

At S750, the RF phased array 115 receives the received signal S'. After converting it into an RF signal, the RF phased array 115 transmits the RF signal to the baseband signal detector 113. The baseband signal detector 113 detects and measures the received signal y.

At S760, the baseband signal detector 113 passes the received signal y to the processor 112 for calculation. The processor 112 determines the Tx codeword $w_t$ and the Rx codeword $w_r$ for setting the Tx AWV and the Rx AWV for the next measurement.

B. The Second Stage: Sparse Reconstruction

As we have estimated the virtual channel $H_{fd}$, we have the following relation:

$$H = \sum_{\ell=1}^{L} \lambda_\ell a_r(\theta_\ell) a_t^H(\psi_\ell) \approx H_{fd}. \quad (18)$$

To reconstruct the original channel H, we need to estimate $\lambda_l$, $\theta_l$ and $\psi_l$. Hence, we formulate the following problem:

$$\underset{\lambda_\ell,\theta_\ell,\psi_\ell}{\text{minimize}} \left\| H_{fd} - \sum_{\ell=1}^{L} \lambda_\ell a_r(\theta_\ell) a_t^H(\psi_\ell) \right\|_F, \quad (19)$$

Then, analogous to the pure CS approach, we sample the AoA and AoD domain with a high resolution, i.e., an angle interval $2/(KN_r)$ at the Rx and $2/(KN_t)$ at the Tx, where K is the over-sampling factor, and we obtain $$A_r = \left[ a_r\left(-1 + \frac{1}{KN_r}\right), a_r\left(-1 + \frac{3}{KN_r}\right), \ldots, a_r\left(-1 + \frac{2KN_r - 1}{KN_r}\right) \right] \text{ and}$$

$$A_t = \left[ a_t\left(-1 + \frac{1}{KN_t}\right), a_t\left(-1 + \frac{3}{KN_t}\right), \ldots a_t\left(-1 + \frac{2KN_t - 1}{KN_t}\right) \right].$$

This manipulation is applicable, but at the cost of a high computational complexity. In fact, by exploiting the search results in Algorithm 1, we can significantly reduce the number of the Rx and Tx candidate AWVs. Concretely, since the estimated AoA of the l-th MPC is $$\hat{\theta}_\ell = -1 + \frac{2n_{r\ell} - 1}{N_r},$$

where $n_{r,l}$ is the index of the best Rx codeword for the l-th MPC obtained at the end of Step 2 of Algorithm 1, the uncertainty range of the l-th AoA should be $$\left[\hat{\theta}_\ell - \frac{2}{N_r}, \hat{\theta}_\ell + \frac{2}{N_r}\right],$$

which means that the candidate AoAs are the angle set obtained by sampling the angle range $$\left[\hat{\theta}_\ell - \frac{2}{N_r}, \hat{\theta}_\ell + \frac{2}{N_r}\right]$$

with an interval $2/(KN_r)$. Consequently, the reduced Rx and Tx candidate AWVs are $$\overline{A}_r = \left[\left[a_r\left(\hat{\theta}_1 - \frac{2}{N_r} + \frac{2k}{KN_r}\right)\right]_{k=0,1,\ldots 2K}, \quad (20)$$
$$\left[a_r\left(\hat{\theta}_2 - \frac{2}{N_r} + \frac{2k}{KN_r}\right)\right]_{k=0,1,\ldots 2K}, \left[a_r\left(\hat{\theta}_L - \frac{2}{N_r} + \frac{2k}{KN_r}\right)\right]_{k=0,1,\ldots 2K}\right],$$

and $$\overline{A}_t = \left[\left[a_t\left(\hat{\psi}_1 - \frac{2}{N_t} + \frac{2k}{KN_t}\right)\right]_{k=0,1,\ldots 2K}, \quad (21)$$
$$\left[a_t\left(\hat{\psi}_2 - \frac{2}{N_t} + \frac{2k}{KN_t}\right)\right]_{k=0,1,\ldots 2K}, \left[a_t\left(\hat{\psi}_L - \frac{2}{N_t} + \frac{2k}{KN_t}\right)\right]_{k=0,1,\ldots,2K}\right],$$

respectively, where $$\hat{\psi}_\ell = -1 + \frac{2m_{t\ell} - 1}{N_t},$$

where $m_{t,l}$ is the index of the best Tx codeword for the l-th MPC obtained at the end of Step 2 of Algorithm I. Then H can be approximately expressed as $H = \overline{A}_r \Sigma \overline{A}_t^H$, where $\Sigma$ is a sparse matrix with every column and every row thereof having at most one nonzero element and with the nonzero elements corresponding to the channel coefficients $\lambda_l$, i.e., $\|\text{vec}(\Sigma)\|_0 = L$. In a sequel, $$\left\|H_{fd} - \sum_{\ell=1}^L \lambda_\ell a_r(\theta_\ell) a_t(\psi_\ell)^H\right\|_F = \quad (22)$$
$$\left\|H_{fd} - \overline{A}_r \sum \overline{A}_t^H\right\|_F = \left\|\text{vec}\left(H_{fd} - \overline{A}_r \sum \overline{A}_t^H\right)\right\|_2 =$$
$$\left\|\text{vec}(H_{fd}) - \text{vec}\left(\overline{A}_r \sum \overline{A}_t^H\right)\right\|_2 =$$
$$\left\|\text{vec}(H_{fd}) - (\overline{A}_t^* \otimes \overline{A}_r)\text{vec}\left(\sum\right)\right\|_2 =$$
$$\left\|\text{vec}(H_{fd}) - \overline{Q}\text{vec}\left(\sum\right)\right\|_2,$$

where $\|.\|_F$ represents Frobenius norm.

Hence, the problem (19) becomes $$\underset{\lambda_\ell, \theta_\ell, \psi_\ell}{\text{minimize}} \left\|\text{vec}(H_{fd}) - \overline{Q}\text{vec}\left(\sum\right)\right\|_2 \quad (23)$$
$$\text{subject to} \left\|\text{vec}\left(\sum\right)\right\|_0 = L,$$

which is a standard sparse reconstruction problem. By using the results of the VMA stage, the size of the dictionary matrix $\overline{Q}$ of the sparse reconstruction problem can be greatly reduced, and thus the problem can be efficiently solved by the classic orthogonal matching pursuit (OMP) method.

In practice, the number of MPCs (i.e., L) is not known a priori. Besides, in some cases, it is not necessary to estimate all of the MPCs. In such cases, the number of MPCs in the VMA-SR method of the present application, in both of the two stages, is set to $L = L_d$, the desired number of MPCs. For instance, if we want to realize a 2-stream transmission, we only need to estimate $L_d = 2$ MPCs, no matter how many MPCs the channel really has.

Given a sufficiently large over-sampling factor K, it is possible to use the VMA-SR method to resolve MPCs with very close AoAs and AoDs, where the AoA and AoD gaps can be smaller than $2/N_r$ and $2/N_t$, respectively. In the VMA stage, we actually search an MPC cluster in each iteration, which can be either a single MPC or the summation of multiple adjacent MPCs with very close AoAs and AoDs. In the SR stage, we have implicitly assumed that there is only one MPC within each searched cluster in (23). If necessary, we can assume that there are κ adjacent MPCs with very close AoAs and AoDs within each cluster, and they can also be separately estimated by solving (23), with $\|\text{vec}(\Sigma)\|_0 = \kappa L$ instead of $\|\text{vec}(\Sigma)\|_0 = L$. The value of κ usually runs from 2 to 4.

Since the sparse reconstruction stage does not need measurement, the total number of measurements of the VMA-SR method is $$T_{VMA-SR} = L(4^{S_0} + 2(\log_2(N_r) + \log_2(N_t) - 2S_0) + 9) \quad (24)$$

Note that this is the training overhead for an analog beamforming/combining structure. In the case of a hybrid structure, where parallel transmission of multiple-stream training sequences is available, the time cost will be further reduced. Simulation results show that the VMA-SR method according to the present application achieves a superior tradeoff between estimation performance and training penalty.

To make the method according to the present application applicable for both analog and hybrid beamforming/combining devices with strict constant-modulus constraint, we particularly design a codebook for the hierarchical search by using an enhanced sub-array scheme. And we need to design w(k,n) with beam widths $2/2^k$ in the k-th layer, for k=0, 1,2, ..., $\log_2$ N. We obey the following procedures to compute w(k,n):

Step 1: Separate w(k,1) into $S_k = 2^{\lceil (\log_2 N - k)/2 \rceil}$ sub-arrays; thus each sub-array has $N_s = N/S_k$ antennas.

Step 2: Set the AWVs of the $S_k$ sub-arrays.

For w(k,1), the steering angle space between adjacent sub-arrays is $\Delta = 2^{1-k}/S_k$, and the steering angles of the sub-arrays are $$\omega_m = -1 + \frac{2m-1}{2}\Delta, m = 1, 2, \ldots, S_k.$$

The steering vector function $a(N_s, \omega_m)$ is defined as $$a(N_s, \omega_m) = \frac{1}{\sqrt{N_s}}[e^{j\pi 0 \omega_m}, e^{j\pi 1 \omega_m}, \ldots, e^{j\pi(N_s-1)\omega_m}]^T.$$

Then, for m=1,2, ... $S_k$, set $$[w(k,1)]_{(m-1)N_s+1:mN_s} = \sqrt{\frac{N_s}{N}} e^{j\rho_m} a(N_s, \omega_m),$$

where the co-phase $\rho_m = -\pi m(N_S-1)\Delta/2 - \pi N_S m(m-1)\Delta/2$,

Step 3: After the first codeword in the k-th layer w(k,1) obtained, all the other codewords in the k-th layer are found through rotating w(k,1) by $$\frac{2n-2}{2^k}, n = 2, 3, \ldots, 2^k,$$

respectively, i.e., $$w(k,n) = w(k,1) \circ \sqrt{N} a\left(N, \frac{2n-2}{2^k}\right),$$

where ° is the entry-wise product.

Figure 8:
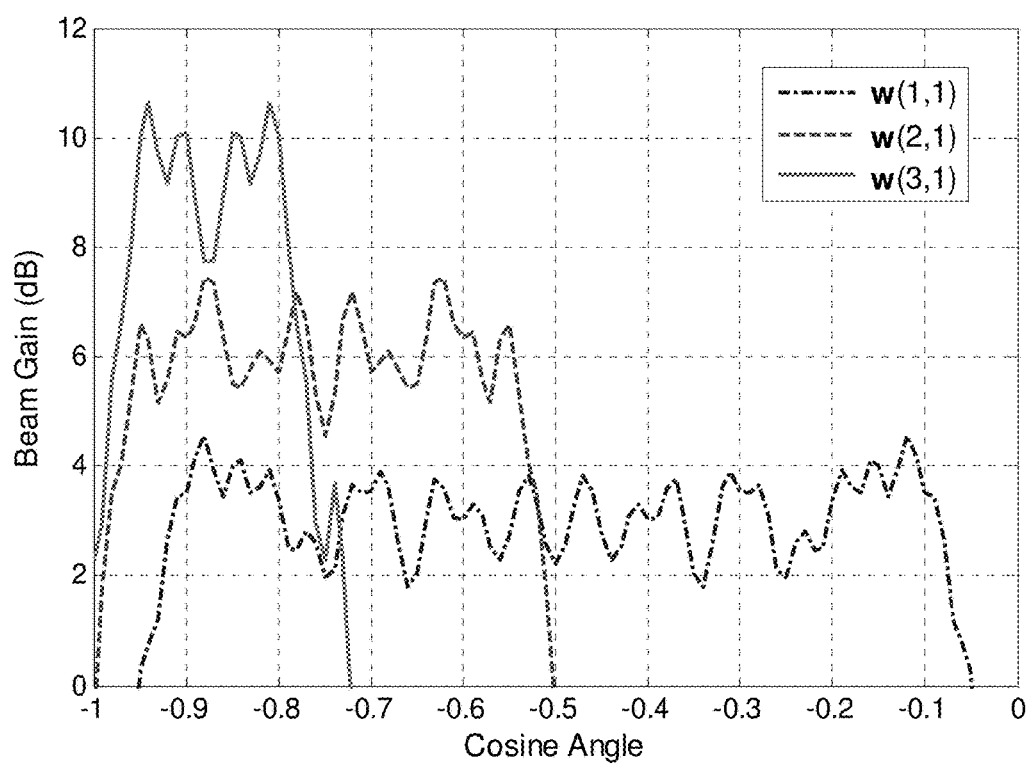
FIG. 8 shows the beam patterns of the proposed enhanced sub-array scheme with a uniform linear array (ULA) codebook, where N=64.

It is clear that there is no deactivation operation for all the codewords. Thus, the codebook according to the present application does not need to turn off some antenna branches and thus increases the maximal total transmission power. FIG. 8 shows the Beam patterns of the enhanced sub-array scheme described above, where we can find that for the 1st and the 3rd layer codewords, the enhanced sub-array scheme can achieve a significantly higher beam gain, due to no deactivation operation. Meanwhile, we can find that for the enhanced sub-array scheme, the beam width of w(1,1) is indeed rowdily 2 tunes of that of w(2,1), and 4 times of that of w(3,1), which are in accordance with that in FIG. 3.

In this invention, we require that the number of elements of a uniform linear array (ULA), i.e., N, be $M^p$ for some positive integers M and p, which is because the proposed codebook design approach needs to divide the array or a sub-array into M smaller sub-arrays. For a ULA with an arbitrary number of elements, the sub-array technology is infeasible if N is not M to an integer power. Hence, the proposed codebook design approach may not be extended to ULAs with an arbitrary number of antenna elements without further modification or accommodation. There are two possible solutions in practice. One is to select a ULA with N being M to an integer power when designing the system, which is reasonable because the beamforming method should be considered in system planning. The other one is to exploit the proposed codebook design approach for beaming with $M^{\lfloor \log_M N \rfloor}$ antennas while deactivating the other ones, where $\lfloor . \rfloor$ is the floor integer operation. Afterwards, further beam refinement can be launched with all the antennas activated.

In the context of this invention, we have adopted a ULA model. In practice, it is more convenient to use a uniform planar array (UPA) in an minWave device, especially when the size of the device is small, because a UPA is more compact than a ULA and can save much area with the same number of antennas. Thus, we generalize the hierarchical codebook, which is designed by applying the enhanced sub-array scheme to UPA. In fact, by exploiting the Kronecker product, a UPA codeword can be obtained based on two ULA codewords. We introduce it in detail as follows.

Suppose the size of a UPA is $N_x \times N_y$, where $N_x$ and $N_y$ are the number of antennas along x and y axes, respectively, and they both are integer powers of 2. Let $w_P(k,n_x,n_y)$ denote the $n_x$ and $n_y$-th (along x and y axes, respectively) codeword in the k-th layer. Then we have $$w_P(k,n_x,n_y) = w_x(k,n_x) \otimes w_y(k,n_y), \quad (25)$$

where $\otimes$ is the Kronecker product, $w_x(k,n_x)$ is the $n_x$-th codeword in the k-th layer of a ULA codebook with $N_x$ antennas, while $w_y(k,n_y)$ is the $n_y$-th codeword in the k-th layer of a ULA codebook with $N_y$ antennas. $w_x(k,n_x)$ and $w_y(k,n_y)$ are ULA codewords and can be computed according to the enhanced sub-array scheme.

Without loss of generality, we design a fully hierarchical UPA codebook by exploiting the approach shown in (25). We assume the size of the UPA is N×N, and thus there is also ($\log_2 N+1$) layers in the codebook. In the k-th layer, k=0,1, 2, ..., $\log_2 N$, there are $4^k$ codewords in total, which are $\{w_P(k,n_x,n_y)|n_x=1,2,3, \ldots, 2^k; n_y=1,2,3, \ldots, 2^k\}$.

Figure 9:
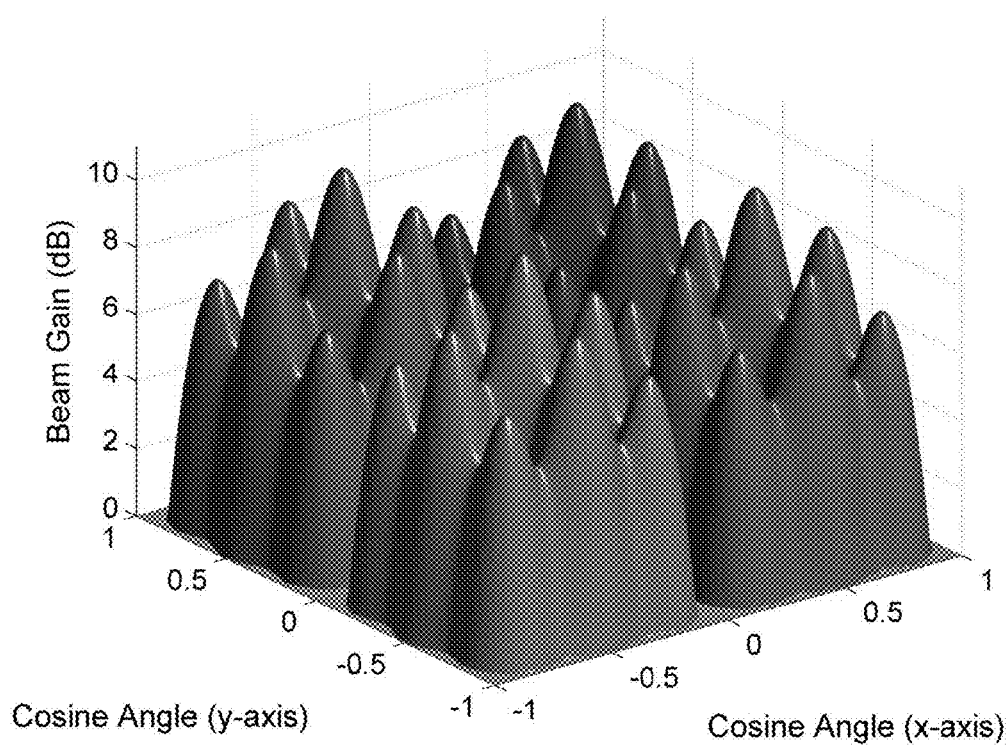
FIG. 9 shows the beam patterns of the codewords in the first layer of a uniform planar array (UPA) codebook, where the size of the UPA is 8×8.

FIG. 9 shows the beam patterns of the codewords in the first layer of a UPA codebook, where the size of the UPA is 8×8. It can be observed that there are $4^1$ codewords, and the beam coverage of a UPA codeword is a 2-dimensional angle domain, including the x and y-axes angel domains. The union of the beam coverage of the 4 codewords is roughly the whole 2-dimensional angle domain. The sub-beams within the beam coverage of each UPA codeword are due to the sub-array technique.

Figure 10:
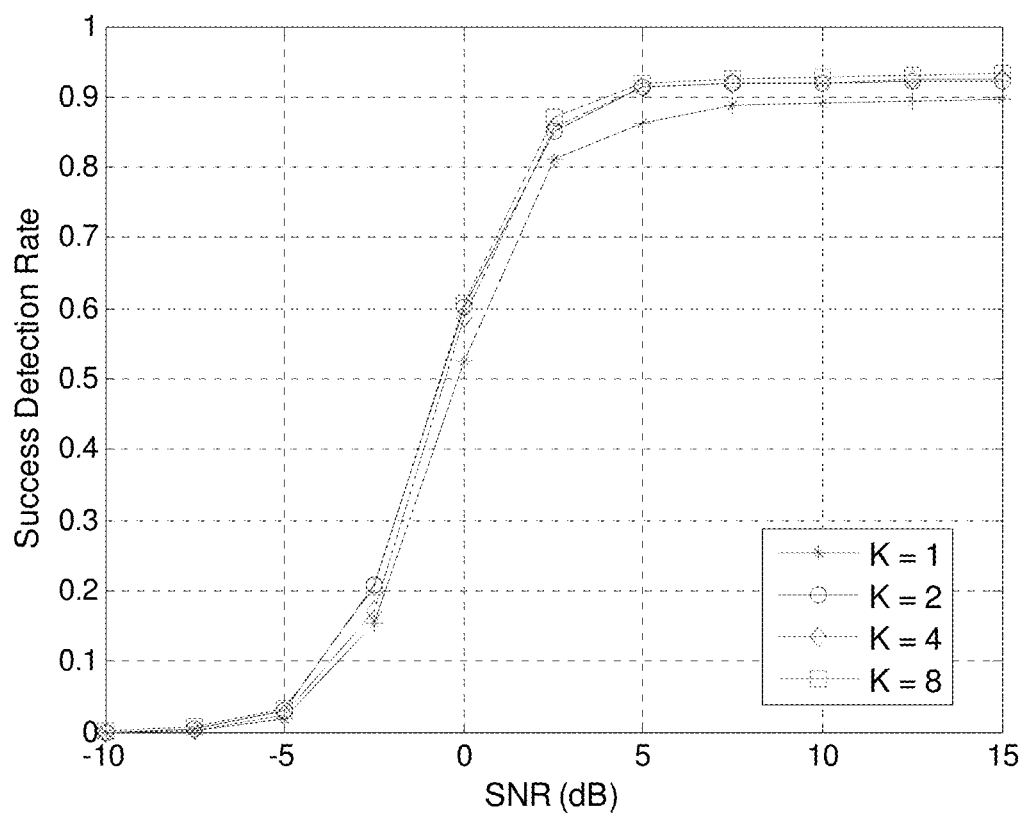
FIG. 10 shows the effect of the over-sampling factor K on the detection performance of the proposed VMA-SR approach.
Figure 11:
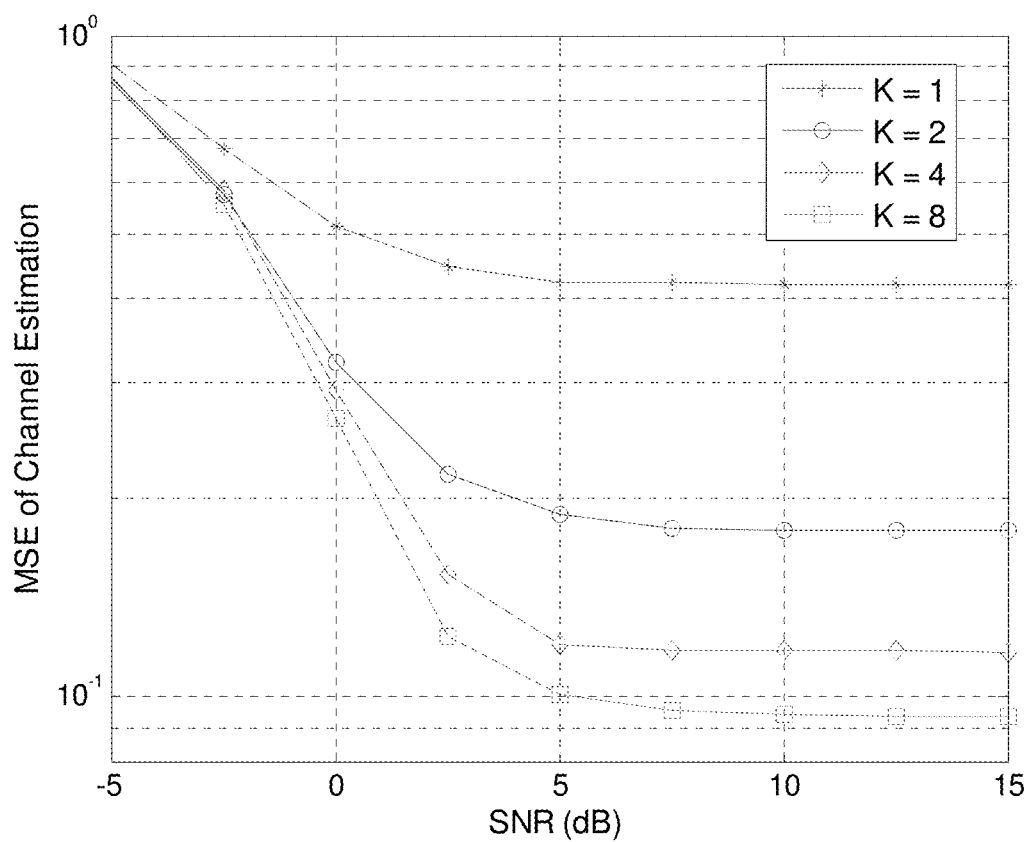
FIG. 11 shows the effect of the over-sampling factor K on the mean squared error (MSE) performance of the proposed VMA-SR approach.

FIGS. 10 and 11 show the effect of the over-sampling factor K on the detection and mean squared error (MSE) performances of the VMA-SR approach. As we can see, the detection performance is improved little by increasing K when K≥2, while the MSE performance is consistently improved when increasing K. However, increasing K will result in larger dictionary matrix $\bar{Q}$ as shown in (23), which increases the computational complexity in the SR stage. In practice, a tradeoff between the MSE performance and the computational complexity is necessary to adopt appropriate K.

What is claimed is:

1. The method of channel estimation for millimeter-wave communication, comprising the steps of:
    providing a millimeter-wave transmitter (Tx) with $N_t$ antennas;
    providing a millimeter-wave receiver (Rx) with $N_r$ antennas;
    performing virtual multipath acquisition (VMA) using a hierarchical search of multiple layers to acquire virtual multipath components (MPCs) and a corresponding virtual channel $H_{fd}$, wherein the hierarchical search for each layer comprises:
        causing the transmitter to transmit signals based on Tx codewords selected from a transmitter codebook,
        causing the receiver to receive signals from the transmitter based on Rx codewords selected from a receiver codebook, obtain measured values of the received signals, process the measured values of the received signals by a processor of the receiver, and to determine Tx codewords and. Rx codewords for the next layer of the hierarchical search, and returning to the transmitter the indexes of the Tx codewords for the next layer, wherein the Tx codewords are used as transmitter antenna weight vectors (Tx AWVs) for shifting the phase of the signals transmitted by the transmitter, and the Rx codewords are used as receiver antenna weight vectors (Rx AWVs) for shifting the phase of the signals received by the receiver;

and performing sparse reconstruction (SR) to reconstruct real MPCs and therefore original channel H from the virtual channel $H_{fd}$ acquired in the VMA step.

2. The method of channel estimation of claim 1, wherein:

the transmitter codebook and the receiver codebook for the hierarchical search are each a hierarchical codebook of $(\log_2 N+1)$ layers having $2^k$ codewords $w(k,j)$, $j=1, 2, \ldots, 2^k$, in the k-th layer, where $N=N_r$ for the receiver codebook and $N=N_t$ for the transmitter codebook, $k=0, 1, 2, \ldots, \log_2 N$;

each codeword in the k-th layer of the hierarchical codebook has $S_k$ sub-arrays, each sub-array covering $N_s=N/S_k$ antennas, where $S_k = 2^{\lceil (\log_2 N-k)/2 \rceil}$ and $\lceil \cdot \rceil$ denotes ceil integer operation; and the hierarchical codebook is constructed according to the following steps:

(a) for $k=0,1,2, \ldots, \log_2 N$, setting the first codeword in the k-th layer $w(k,1)$ according to $$[w(k, 1)]_{(m-1)N_s+1:mN_s} = \sqrt{\frac{N_s}{N}} e^{j\rho_m} a(N_s, \omega_m), \ m = 1, 2, \ldots, S_k,$$

where $\rho_m = -\pi m(N_s - 1)\Delta/2 - \pi N_s m(m - 1)\Delta/2.$ $\Delta = 2^{1-k}/S_k,$ $a(N_s, \omega_m) = \frac{1}{\sqrt{N_s}}[e^{j\pi 0 \omega_m}, e^{j\pi 1 \omega_m}, \ldots, e^{j\pi(N_s-1)\omega_m}]^T$, and $\omega_m = -1 + \frac{2m-1}{2}\Delta;$ (b) for $k=1,2, \ldots, \log_2 N$, setting other codewords in the k-th layer according to $$w(k, n) = w(k, 1) \circ \sqrt{N} \, a\left(N, \frac{2n-2}{2^k}\right), n = 2, 3, \ldots, 2^k,$$

where ∘ is the entry-wise product.

3. The method of channel estimation of claim 2, wherein the hierarchical search comprises the following steps:

setting $S_t = \log_2 N_t$, $S_r = \log_2 N_r$, $S = \log_2 N$, where $N=N_r$ if $N_r \leq N_t$, otherwise $N=N_t$; setting initial layer index $S_0$ and initializing $H_{fd}=0$;

executing the following steps for each $l=1,2, \ldots, L$, where L is a predetermined number of real MPCs:

(1) performing a search over all $2^{S_0} \times 2^{S_0}$ Tx/Rx codeword pairs in the $S_0$-th layer to find a best Tx/Rx codeword pair $w_t(S_0,m_t)$ and $w_r(S_0,n_r)$, for which the value of $y_m - w_r(S_0, n_r)^H H_{fd} w_t(S_0, m_t)$ is the largest, where $w_r$ and $w_t$ respectively denote the receiver codeword and the transmitter codeword, $y_m$ is the measured value of the received signal corresponding to the Tx/Rx codeword pair $w_t(S_0,m_t)$ and $w_r(S_0,n_r)$;

(2A) performing a search for a best Tx/Rx codeword pair for each layer from the $(S_0+1)$-th layer to the S-th layer, wherein the best Tx/Rx codeword pair in the s-th layer is acquired by first finding (a,b) in the following problem:

$y(m, n) = y_m(m, n) - w_r(s, 2(n_r - 1) + n)^H H_{fd} w_t(s, 2(m_t - 1) + m),$ $(a, b) = \underset{(m,n)}{\mathrm{argmax}} |y(m, n)|,$ where $m_t$ and $n_r$ are respectively the indexes of the best Tx/Rx codeword pair acquired from the immediate preceding layer, m and n are in range of $\{1,2\}$, $y_m(m,n)$ is the measured value of the corresponding received signal, and then updating the best Tx/Rx codeword indexes $m_t$ and $n_r$ according to:

$m_t = 2(m_t - 1) + a,$ $n_r = 2(n_r - 1) + b$ (2B) if $S_t > S_r$, performing a search for best Tx/Rx codeword pair for each layer from the $(S+1)$-th layer to the $S_t$-th layer, wherein the best Tx/Rx codeword pair in the s-th layer is acquired by first finding b in the following problem:

$y'(n) = y'_m(m) - w_r(s, 2(n_r - 1) + n)^H H_{fd} w_t(S_t, m_t),$ $a = \underset{n}{\mathrm{argmax}} |y'(m)|,$ where $m_t$ and $n_r$ are respectively the indexes of the best Tx/Rx codeword pair acquired from the immediate preceding layer, n is in range of $\{1,2\}$, $y'_m(n)$ is the measured value of the corresponding received signal, and then updating the best Tx/Rx codeword index $n_r$ according to:

$n_r = 2(n_r - 1) + b;$ or if $S_r > S_t$, performing a search for a best Tx/Rx codeword pair for each layer from the $(S+1)$-th layer to the $S_r$-th layer, wherein the best Tx/Rx codeword pair in the s-th layer is acquired by first finding a in the following problem:

$y'(m) = y'_m(m) - w_r(S_r, n_r)^H H_{fd} w_t(s, 2(m_t - 1) + m),$ $a = \underset{m}{\mathrm{argmax}} |y'(m)|,$ where $m_t$ and $n_r$ are respectively the indexes of the best Tx/Rx codeword pair acquired from the immediate preceding layer, m is in range of $\{1,2, y'_m(m)$ is the measured value of the corresponding received signal, and then updating the best Tx/Rx codeword index $m_t$ according to:

$m_t = 2(m_t - 1) + a,$ whereby the best Tx/Rx codeword pair $w_t(S_t, m_t)$ and $w_r(S_r, n_r)$ for the l-th MPC is acquired;

(3) Measuring received signals that correspond to codeword pairs $w_r(S_r, n_r + n)$ and $w_t(S_t, m_t + m)$, where m and n are in range of $\{-1,0,1\}$, to obtain nine virtual MPCs for the l-th real MPC, and updating the virtual channel $H_{fd}$ according to $$H_{fd}=H_{fd}+y_m(m,n)w_r(S_r,n_{rl}+n)w_t(S_t,m_{tl}+m)^H$$

for all permutations of m and n, where $y_m(m,n)$ is the measured value of the corresponding received signal.

4. The method of channel estimation of claim 3, wherein the SR step comprises:
(a) calculating reduced Rx candidate antenna weight vectors $\bar{A}_r$ and reduced Tx candidate antenna weight vectors $\bar{A}_t$ according to $$\bar{A}_r = \left[\left[a_r\left(\hat{\theta}_1 - \frac{2}{N_r} + \frac{2k}{KN_r}\right)\right]_{k=0,1,\ldots,2K}, \left[a_r\left(\hat{\theta}_2 - \frac{2}{N_r} + \frac{2k}{KN_r}\right)\right]_{k=0,1,\ldots,2K},\right.$$
$$\left. \ldots \left[a_r\left(\hat{\theta}_L - \frac{2}{N_r} + \frac{2k}{KN_r}\right)\right]_{k=0,1,\ldots,2K}\right], \text{ and}$$

$$\bar{A}_t = \left[\left[a_t\left(\hat{\psi}_1 - \frac{2}{N_t} + \frac{2k}{KN_t}\right)\right]_{k=0,1,\ldots,2K}, \left[a_t\left(\hat{\psi}_2 - \frac{2}{N_t} + \frac{2k}{KN_t}\right)\right]_{k=0,1,\ldots,2K},\right.$$
$$\left. \ldots \left[a_t\left(\hat{\psi}_L - \frac{2}{N_t} + \frac{2k}{KN_t}\right)\right]_{k=0,1,\ldots,2K}\right],$$

where $$\hat{\theta}_\ell = -1 + \frac{2n_{r\ell} - 1}{N_r}, \hat{\psi}_\ell = -1 + \frac{2m_{t\ell} - 1}{N_t}, \ell = 1, 2, \ldots, L,$$

$m_{tl}$ and $n_{rl}$ respectively denote the indexes of the best Tx/Rx codeword pair acquired for the l-th MPC, $$a_r(\theta) = \frac{1}{\sqrt{N_r}}[e^{j\pi 0\theta}, e^{j\pi 1\theta}, \ldots, e^{j\pi(N_t-1)\theta}]^T,$$

$$a_t(\psi) = \frac{1}{\sqrt{N_t}}[e^{j\pi 0\psi}, e^{j\pi 1\psi}, \ldots, e^{j\pi(N_t-1)\psi}]^T,$$

K is an over-sampling factor;
(b) solving $$\min_{\lambda_\ell,\theta_L,\psi_\ell}\|vec(H_{fd}) - (\bar{A}_t^* \otimes \bar{A}_r)vec(\Sigma)\|_2$$

subject to $\|vec(\Sigma)\|_0 = L$, where
$\otimes$ is the Kronecker product,
the superscript * denotes conjugate, to obtain values of channel coefficients $\lambda_\ell$, angles of arrival $\theta_\ell$ and angles of departure $\psi_\ell$; and
(c) calculating channel matrix H by $$H=\bar{A}_r\Sigma\bar{A}_t^H,$$

where $\Sigma$ is a sparse matrix with every column and every row thereof having at most one nonzero element and with the nonzero elements corresponding to the channel coefficients $\lambda_\ell$, and the superscript H denotes conjugate transpose.

5. The method of channel estimation of claim 4, wherein an orthogonal matching pursuit (OMP) algorithm is used to solve the problem in step (b).

6. The method of channel estimation of claim 1, wherein during the VMA step four virtual MPCs are acquired for each real MPC.

7. The method of channel estimation of claim 4, wherein the problem in step (b) is solved subject to $vec(\Sigma)\|_0 = \kappa L$ instead of $vec(\Sigma)\|_0 = L$, assuming there are $\kappa$ adjacent MPCs with very close angles of arrival (AoAs) and angles of departure (AoDs) within each cluster.

8. The method of channel estimation of claim 1, wherein the transmitter codebook and the receiver codebook are each a uniform planar array (UPA) codebook based on two uniform linear array (ULA) codebooks.

9. The method of channel estimation of claim 8, wherein the UPA codebook has $N_x$ and $N_y$ antennas along x and y axes, respectively, both $N_x$ and $N_y$ being integer powers of 2, and
the $n_x$ and $n_y$-th (along x and y axes, respectively) codeword in the k-th layer of the UPA codebook, denoted as $w_P(k,n_x,n_y)$ is expressed as $$w_P(k,n_x,n_y)=w_x(k,n_x)\otimes w_y(k,n_y),$$

where $\otimes$ is the Kronecker product, $w_x(k,n_x)$ is the $n_x$-th codeword in the k-th layer of a ULA codebook with $N_x$ antennas, while $w_y(k,n_y)$ is the $n_y$-th codeword in the k-th layer of a ULA codebook with $N_y$ antennas.

10. The method of channel estimation of claim 1, wherein the transmitter includes a digital baseband and an RF phased array, the RF phased array including an RF chain and $N_t$ transmitting antenna branches each having a phase shifter connected to the RF chain, a power amplifier connected to the phase shifter, and one of said $N_t$ antennas connected to the power amplifier; and
the receiver includes an RF phased array and a digital baseband, the RF phased array including an RF chain, an adder having an output end connected to the RF chain, and $N_r$ receiving antenna branches each having one of said $N_r$ antennas, a low noise amplifier connected to the antenna, a phase shifter connected between the low noise amplifier and an input end of the adder.

11. The method of channel estimation of claim 10, wherein the digital baseband of the receiver comprises a baseband signal detector, a beam controller, and said processor of the receiver, wherein the processor controls the baseband signal detector to detect the received signal and controls the beam controller to generate an Rx codeword for the RF phased array of the receiver.

12. The method of channel estimation of claim 10, wherein the digital baseband of the transmitter comprises a controller, a baseband signal generator, and a beam controller, wherein the controller controls the baseband signal generator to generate a baseband signal and controls the beam controller to generate a Tx codeword for the RF phased array of the transmitter.

13. The method of channel estimation of claim 1, wherein the processor of the receiver is a computer configured with software and memory for processing the measured values of received signals.

14. The method of channel estimation of claim 13, wherein the SR step is performed by the computer configured with software and memory for performing the SR step.

15. The codebook for the hierarchical search in the method of channel estimation of claim 1, wherein:
the codebook is a hierarchical codebook of $(\log_2 N+1)$ layers having $2^k$ codewords $w(k, j)$, $j=1,2,\ldots,2^k$, in the k-th layer, where $N=N_r$ for the receiver codebook and $N=N_t$ for the transmitter codebook, $k=0,1,2,\ldots,\log_2 N$;
each codeword in the k-th layer of the hierarchical codebook has $S_k$ sub-arrays, each sub-array covering $N_S=N/S_k$ antennas, where $S_k=2^{\lceil(\log_2 N-k)/2\rceil}$ and $\lceil\cdot\rceil$ denotes coil integer operation; and the hierarchical codebook is constructed according to the following steps:

(a) for k=0,1,2, ..., $\log_2 N$, setting the first codeword in the k-th layer w(k,1) according to $$[w(k, 1)]_{(m-1)N_s+1:mN_s} = \sqrt{\frac{N_s}{N}} e^{j\rho_m} a(N_s, \omega_m), m = 1, 2, \ldots, S_k,$$

where $$\rho_m = -\pi m(N_s - 1)\Delta/2 - \pi N_s m(m-1)\Delta/2.$$

$$\Delta = 2^{1-k}/S_k,$$

$$a(N_s, \omega_m) = \frac{1}{\sqrt{N_s}} [e^{j\pi 0 \omega_m}, e^{j\pi 1 \omega_m}, \ldots, e^{j\pi(N_s-1)\omega_m}]^T, \text{ and}$$

$$\omega_m = -1 + \frac{2m-1}{2}\Delta;$$

(b) for k=1,2, ..., $\log_2 N$, setting other codewords in the k-th layer according to $$w(k, n) = w(k, 1) \circ \sqrt{N} \, a\!\left(N, \frac{2n-2}{2^k}\right), n = 2, 3, \ldots, 2^k,$$

where ∘ is the entry-wise product.

* * * * *